(12) United States Patent
Roberts

(10) Patent No.: US 8,079,073 B2
(45) Date of Patent: Dec. 13, 2011

(54) DISTRIBUTED FIREWALL IMPLEMENTATION AND CONTROL

(75) Inventor: David A. Roberts, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1062 days.

(21) Appl. No.: 11/429,476

(22) Filed: May 5, 2006

(65) Prior Publication Data

US 2007/0261111 A1 Nov. 8, 2007

(51) Int. Cl.
*G06F 15/16* (2006.01)
*G06F 15/173* (2006.01)
*G06F 17/00* (2006.01)

(52) U.S. Cl. ............. 726/11; 726/13; 709/223; 709/238

(58) Field of Classification Search .................. None
See application file for complete search history.

(56) References Cited

U.S. PATENT DOCUMENTS

| | | | |
|---|---|---|---|
| 5,606,668 A | 2/1997 | Shwed | |
| 5,802,591 A | 9/1998 | Yachida | |
| 5,835,726 A | 11/1998 | Shwed et al. | |
| 5,919,258 A | 7/1999 | Kayashima et al. | |
| 5,968,176 A | 10/1999 | Nessett et al. | |
| 5,974,549 A | 10/1999 | Golan | |
| 5,987,611 A | 11/1999 | Freund | |
| 6,003,084 A | 12/1999 | Green et al. | |
| 6,003,133 A | 12/1999 | Moughanni et al. | |
| 6,009,469 A * | 12/1999 | Mattaway et al. | 709/227 |
| 6,009,475 A | 12/1999 | Shrader | |
| 6,088,804 A | 7/2000 | Hill et al. | |
| 6,131,163 A | 10/2000 | Wiegel | |
| 6,149,585 A * | 11/2000 | Gray | 600/300 |
| 6,154,775 A | 11/2000 | Coss et al. | |
| 6,212,558 B1 | 4/2001 | Antur et al. | |
| 6,219,706 B1 | 4/2001 | Fan et al. | |
| 6,253,321 B1 | 6/2001 | Nikander et al. | |
| 6,347,376 B1 | 2/2002 | Attwood et al. | |
| 6,466,976 B1 * | 10/2002 | Alles et al. | 709/224 |
| 6,480,959 B1 | 11/2002 | Granger et al. | |
| 6,496,935 B1 | 12/2002 | Fink et al. | |
| 6,513,122 B1 | 1/2003 | Magdych et al. | |
| 6,611,875 B1 | 8/2003 | Chopra et al. | |
| 6,631,466 B1 | 10/2003 | Chopra et al. | |
| 6,636,898 B1 | 10/2003 | Ludovici et al. | |
| 6,643,776 B1 | 11/2003 | Boden | |
| 6,697,810 B2 | 2/2004 | Kumar et al. | |

(Continued)

FOREIGN PATENT DOCUMENTS

EP 0910197 A2 4/1999

(Continued)

OTHER PUBLICATIONS

Written Opinion for PCT/US2007/011053 mailed Oct. 14, 2008.

(Continued)

*Primary Examiner* — Matthew Henning

(57) ABSTRACT

One or more devices on a network may be configured to provide firewall services for other devices on the network. Each of the firewall service suppliers may publish its capability with respect to firewall services and the service receivers may publish their requirements for firewall services. A manager function may broker the requests and offers to match services and requirements. A default firewall service may be provided to devices not publishing their requirements. Network topologies may be re-configured to first route traffic addressed to a device to its corresponding firewall service provider.

20 Claims, 9 Drawing Sheets

U.S. PATENT DOCUMENTS

| | | | |
|---|---|---|---|
| 6,721,890 | B1 | 4/2004 | Shrikhande |
| 6,792,615 | B1 | 9/2004 | Rowe et al. |
| 6,931,529 | B2 | 8/2005 | Kunzinger |
| 6,938,155 | B2 | 8/2005 | D'Sa et al. |
| 6,941,474 | B2* | 9/2005 | Boies et al. ............... 726/11 |
| 6,944,183 | B1 | 9/2005 | Iyer et al. |
| 6,976,177 | B2 | 12/2005 | Ahonen |
| 7,016,901 | B2 | 3/2006 | Eikenbery |
| 7,024,460 | B2 | 4/2006 | Koopmas et al. |
| 7,120,931 | B1 | 10/2006 | Cheriton |
| 7,290,145 | B2* | 10/2007 | Falkenthros ............... 713/182 |
| 7,308,711 | B2 | 12/2007 | Swander et al. |
| 7,567,560 | B1 | 7/2009 | Balasubramaniyan |
| 7,761,708 | B2 | 7/2010 | Swander et al. |
| 2001/0013049 | A1* | 8/2001 | Ellis, III .................. 709/201 |
| 2002/0038371 | A1* | 3/2002 | Spacey ..................... 709/227 |
| 2002/0097724 | A1 | 7/2002 | Halme et al. |
| 2002/0143855 | A1* | 10/2002 | Traversat et al. ........... 709/202 |
| 2002/0162026 | A1 | 10/2002 | Neuman et al. |
| 2002/0193049 | A1 | 12/2002 | Boucher et al. |
| 2002/0194049 | A1 | 12/2002 | Boyd |
| 2003/0005328 | A1 | 1/2003 | Grewal et al. |
| 2003/0028806 | A1 | 2/2003 | Govindarajan et al. |
| 2003/0084331 | A1 | 5/2003 | Dixon et al. |
| 2003/0084334 | A1* | 5/2003 | Miyao et al. ............... 713/200 |
| 2003/0110379 | A1 | 6/2003 | Ylonen et al. |
| 2003/0120809 | A1 | 6/2003 | Bellur et al. |
| 2003/0233568 | A1 | 12/2003 | Maufer et al. |
| 2004/0003290 | A1 | 1/2004 | Malcolm |
| 2004/0037268 | A1 | 2/2004 | Read |
| 2004/0078600 | A1 | 4/2004 | Nilsen et al. |
| 2004/0148439 | A1 | 7/2004 | Harvey et al. |
| 2004/0168150 | A1 | 8/2004 | Ziv |
| 2004/0177273 | A1 | 9/2004 | Ghaffar |
| 2004/0205211 | A1 | 10/2004 | Takeda et al. |
| 2004/0250131 | A1 | 12/2004 | Swander et al. |
| 2004/0250158 | A1* | 12/2004 | Le Pennec et al. ............ 714/4 |
| 2005/0005165 | A1 | 1/2005 | Morgan et al. |
| 2005/0010816 | A1 | 1/2005 | Yu et al. |
| 2005/0022010 | A1 | 1/2005 | Swander et al. |
| 2005/0022011 | A1 | 1/2005 | Swander et al. |
| 2005/0079858 | A1 | 4/2005 | Rosen et al. |
| 2005/0091068 | A1 | 4/2005 | Ramamoorthy et al. |
| 2005/0138380 | A1 | 6/2005 | Fedronic et al. |
| 2005/0182967 | A1 | 8/2005 | Phillips et al. |
| 2005/0198384 | A1 | 9/2005 | Ansari et al. |
| 2005/0204402 | A1 | 9/2005 | Turley et al. |
| 2005/0229246 | A1 | 10/2005 | Rajagopal et al. |
| 2005/0262554 | A1 | 11/2005 | Brooks et al. |
| 2005/0283823 | A1 | 12/2005 | Okajo et al. |
| 2006/0015935 | A1 | 1/2006 | Dixon et al. |
| 2006/0062238 | A1 | 3/2006 | Mahendran et al. |
| 2006/0101266 | A1 | 5/2006 | Klassen et al. |
| 2006/0253901 | A1 | 11/2006 | Roddy et al. |
| 2007/0118893 | A1 | 5/2007 | Crawford |
| 2007/0174031 | A1 | 7/2007 | Levenshteyn et al. |
| 2007/0250922 | A1 | 10/2007 | Horton et al. |
| 2007/0261111 | A1 | 11/2007 | Roberts |
| 2007/0271361 | A1 | 11/2007 | Abzarian et al. |

FOREIGN PATENT DOCUMENTS

| | | |
|---|---|---|
| EP | 1024627 | 8/2000 |
| EP | 1119151 | 7/2001 |
| EP | 1484860 A1 | 12/2004 |
| JP | 2005-217757 | 8/2005 |
| WO | WO03090034 | 10/2003 |
| WO | WO2004010659 | 1/2004 |
| WO | WO2007136811 A3 | 11/2007 |

OTHER PUBLICATIONS

International Search Report for PCT/US2007/011053 mailed Oct. 14, 2008.

European Search Report regarding European Application No. 04009309.8 dated May 5, 2005.

Strassner et al., Policy Framework Core Information Model, Internet Draft, May 17, 1999, XP002255652.

Vagish et al., NT5.1 IPSecurity Security Policy Database, Microsoft Corporation, Sep. 1999.

Markham et al., Security at the Network Edge: A Distributed Firewall Architecture, Jun. 12-14, 2001, DARPA Information Survivability Conference & Exposition II, 2001. DISCEX '01. Proceedings.

McDonald et al., A Socket-Based Key Management API (and Surrounding Infrastructure), retrieved from http://www.isoc.orglisoclwhatislconferenceslinet196/proceedsingsld7/d7 2htm on May 21, 2005.

Bellovin, "Computer Security—An End State?", Communications of the ACM, vol. 44. No. 3, Mar. 2001.

Bellovin, "Distributed Firewall", issue of ;login, Nov. 1999.

"Whister Server Authorization in IPSec", IPSec development Team, Microsoft, May 2000.

"NT 6.0 User Authentication", IPSec Development Team, Microsoft, May 2000.

"NT 6.0 IPSecWinsock Extensions", IPSec Development Team, Nov. 2000.

Adoba, "The Authentication and Authorization Problem in Roaming", Network Working Group, Mar. 1997.

Narayan, Diameter Strong Securitiy Extension Using Kerberos v5, Network Working Group, Feb. 2001.

Narayan, Radius Securitiy Extensions Using Kerberos v5, Network Working Group, Aug. 2000.

Jiang, "Secure Radius Server Operation Guidelines for Dial Roaming", Network Working Group, Oct. 1997.

Aboba, "Certificate-Based Roaming", Network Working Group, Feb. 1999.

"IP Security for Microsoft Windows 2000 Server White Paper", Microsoft Windows 2000 Server Operating System, Microsoft Corporation, 1999.

LeBlanc, "Bind Basics", http://www.windowsitpro.comlWindowsSecurity/Article/ArticleID/9196/9196.html, Jun. 2000.

Harkins et al, RFC 2409, "The Internet Key Exchange (IKE)", Nov. 1998.

Rigney et al., Remote Authentication Dial in User Service (RADIUS), The Internet Society, Jun. 2000.

Rigney, "Radius Accounting", The Internet Society, Jun. 2000.

McDonald et al., "PF_KEY Key Management API, Version 2", The Internet Society, Jul. 1998.

Calhoun et al., "Diameter Base Protocol", The Internet Society, Apr. 2000.

Calhoun, Comparison of Diameter Against AAA Network Access Requirements, The Internet Society, Apr. 2000.

Calhoun et al., "Diameter Framework Document", The Internet Society, Apr. 2000.

Calhoun et al., "Diameter Secure Proxying", The Internet Society, Oct. 1999.

Calhoun et al., "Diameter Strong Security Extension", The Internet Society, Apr. 2000.

"UDDI Technical White Paper", Universal Description, Discovery and Integration (uddi.org), Ariba, Inc. International Business Machines Corporation, Sep. 2000.

"Host-Resident Firewalls: Defending Windows NTl2000 Servers and Desktops from Network Attacks, A Security White Paper", Network—1 Security Solutions, Inc., 2000.

Li, "Distributed Firewall", Dec. 2000.

Ioannidis et al., Implementing a Distributed Firewall, DARPA, Nov. 2000.

"Distributed Firewalls.com", Network—1 Security Solutions, Inc., at http://207.254.108.217/firewall.html, visited May 31, 2001.

Office Action from the State Intellectual Property Office of the People's Republic of China regarding Application No. 200780016108.8 dated Mar. 22, 2011.

Aberer et al., "An Overview on Peer-to-Peer Information Systems," Workshop on Distributed Data and Structures (WDAS-2002), Mar. 2002. .

Wolthusen, "Layered Multipoint Network Defense and Security Policy Enforcement," 2001 IEEE Workshop on Information Assurance and Security, Jun. 2001.

International Preliminary Report on Patentability, Written Opinion, and Search Report regarding International Application No. PCT/US2007/012024, Dated Jan. 22, 2008.

"Cisco Catalyst 6500 and Cisco 7600 Firewall Services Module", Cisco Systems, Inc., Oct. 2005, available at http://www.cisco.com/application/pdf/en/us/guest/products/ps4452/c1031/cdccont_0900aecd80356e40.pdf.

"German Information Security Agency (BSI) Firewall Study II", Ernst & Young and Sun Microsystems GmbH, May 2001, available at http://www.bsi.de/literat/studien/firewall/fw01eng/fwstude.pdf.

"Firewalking A Traceroute-Like Analysis of IP Packet Responses to Determine Gateway Access Control Lists, Cambridge Technology Partners," Oct. 1998, available at http://www.packetfactory.net/firewalk/firewalk-final.html.

International Search Report regarding International Application No. PCT/US2007/011637 dated Dec. 28, 2007.

\* cited by examiner

DISTRIBUTED FIREWALL IMPLEMENTATION AND CONTROL

BACKGROUND

A computer connected to a network is vulnerable to attack from other computers on that network. If the network is the Internet, the attacks may include a range of acts from malicious attempts to gain access to the computer, to installing "zombie" code, to denial of service attacks. Malicious attempts to gain access to the computer may have the intent of discovering personal data, while zombie code may be used to launch denial of service attacks by overwhelming a web site with high traffic volumes from a number of computers. The attackers may include organized criminals, sophisticated but malicious computer experts, and "script kiddies" who read and repeat posted assaults on known vulnerabilities.

Most computers have addressable ports for sending and receiving data. Some of the ports may be designated for certain kinds of traffic. For example, in an Internet Protocol (IP) network, port 80 is often designated for hyptertext protocol (http) traffic, while port 443 is often designated for secure http (https) traffic. Other ports may be designated as needed for different services. Non-designated traffic on such designated ports and any traffic on unused ports may indicate attempts by attackers to gain access to the computer.

A firewall may be used to limit port traffic to certain protocols and to close unused ports from all outside traffic. The firewall may be placed on a network between computers seeking protection and "open" networks, such as the Internet, or may be integral to the computer. In corporations, or other large private networks, firewalls may also be used to limit traffic between business units. The firewall may block traffic at a designated port having the wrong protocol, for example, file transfer protocol (FTP) may be blocked on port 80. Similarly, the firewall may block all traffic on an unused port. Both hardware and software implementations of firewalls are available.

SUMMARY

A network, such as a local area network with a variety of electronic devices, may have a first group of devices capable of providing firewall services as well as a second group of devices with limited or no firewall capability. By publishing the firewall service capabilities of those devices having such a capability or by publishing the firewall requirements of devices needing firewall services, or both, the network may be configured to allow the first group to supply firewall service to devices of the second group.

To support such a distributed firewall service. A device may need a capability to make known its interest/ability to supply firewall services. As well, another device may need a capability to publish its desire for firewall services. Network routing changes may need to be effected to reroute data traffic such that firewall services may be rendered and a manager function may be needed to match capabilities with needs and to direct data traffic rerouting. In addition, the manager function may enforce rules for minimum levels of firewall services for those devices that may not publish their needs, or whose published capabilities do not meet other system-level minimum requirements. The manager function may be independent of other devices in the network, such as in a router, or may be incorporated in one of the devices supplying or using firewall services.

DETAILED DESCRIPTION OF VARIOUS EMBODIMENTS

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
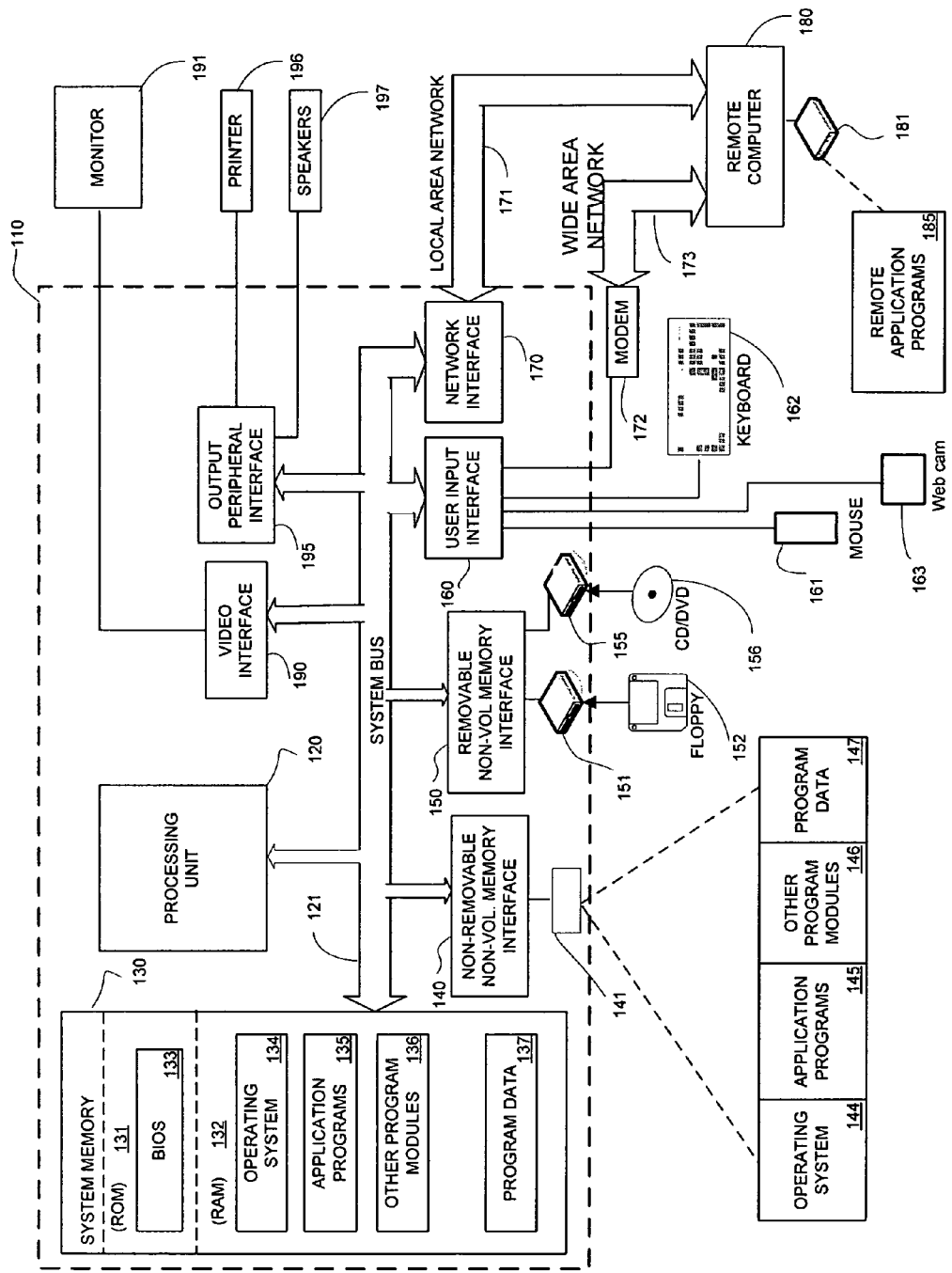
FIG. 1 is a block diagram of a computer suitable for use in a network supporting a distributed firewall environment.

FIG. 1 illustrates a computing device in the form of a computer 110 that may participate in a distributed firewall system. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Another input device may be a camera for sending images over the Internet, known as a web cam 163. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. The network interface or adapter 170 may include a firewall capability, as is discussed further below. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
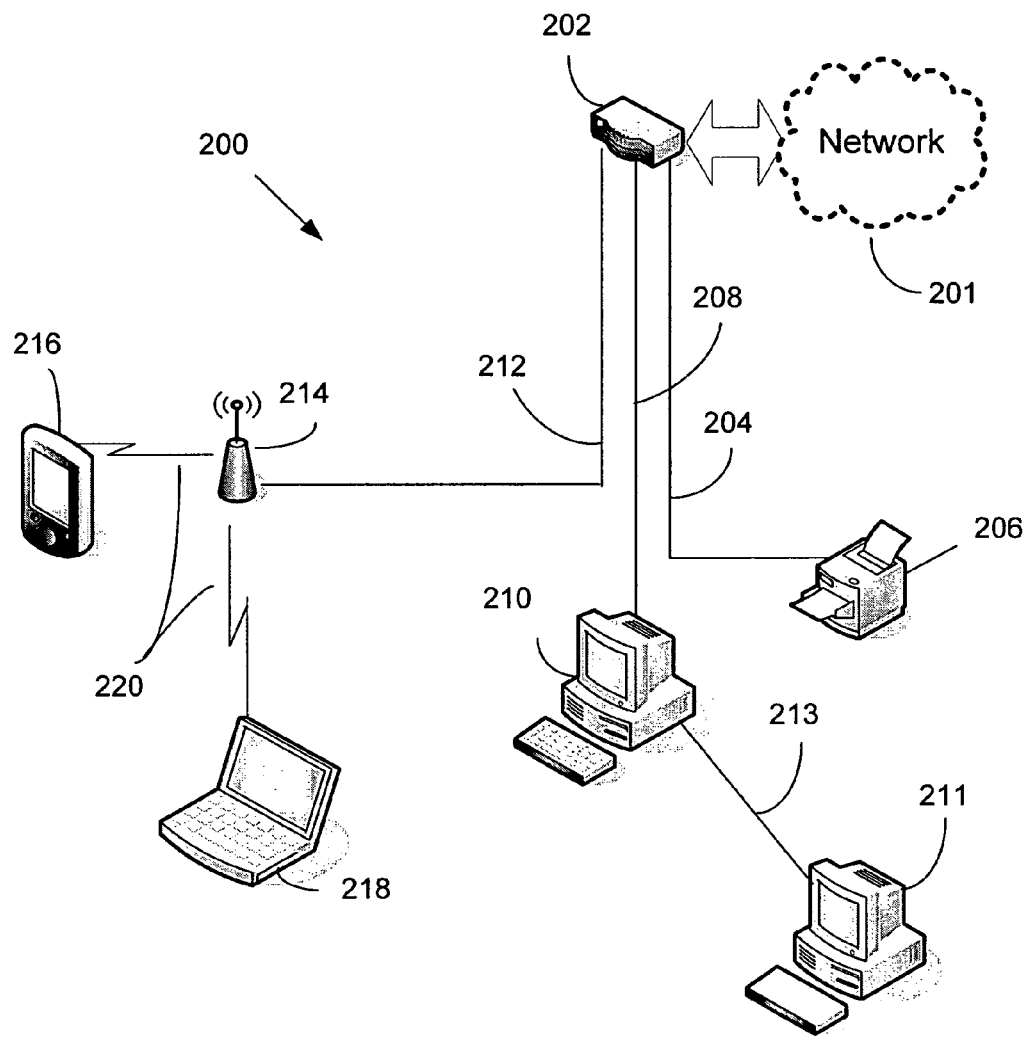
FIG. 2 is a block diagram of a computer network capable of supporting a distributed firewall implementation.

FIG. 2 illustrates a computer network 200 capable of supporting a distributed firewall implementation. An external network 201, such as the Internet, may be connected to the computer network 200 by a network interface, such as router or Internet gateway device (IGD) 202. The connection between the IGD 202 and the network 201 may be referred to as the upstream connection of the IGD 202. On the opposite side of the IGD 202 may be one or more downstream connections. A first downstream connection 204 may be coupled to a printer 206 shared on the computer network 200, although it may also be made available to resources on the external network 201. A second downstream connection 208 may be coupled first to a computer 210 and subsequently to a computer 211. In this configuration, the computer 210 may share its connection with computer 211 over network connection 213 through facilities such as Internet connection sharing (ICS) available through Microsoft's Windows™ operating system. Another downstream connection 212 from the IGD 202 may couple to a wireless access point 214 supporting network access to a wireless device 216, such as a smart phone/personal digital assistant (PDA) and laptop 218 over a wireless transport 220.

In a traditional, prior art implementation, the IGD 202 may also include a firewall and perform that function for all devices on the downstream side of the IGD 202. This may result in all the downstream connections 204 208 212 and each associated device having the same firewall settings. The settings in an IGD-based firewall may default to a minimum level of protection or may not account for the different needs of some devices over others, such as printer 206 versus a wireless device 216. Current art IGD's, in addition to firewall services, often perform network address translation (NAT). IGD's supporting IPv6 will no longer provide NAT and may also minimize support for firewall services, making a distributed approach to providing firewall services more attractive, if not a necessity.

Firewall services may include a number of functions that provide a range of protective capabilities. Most firewalls have the ability to block unused ports, that is, to reject any incoming traffic on a port that is not currently associated with a particular application or service. On designated ports, the firewall may restrict traffic to an authorized protocol, such as http (hypertext transfer protocol) or ftp (file transfer protocol). Additionally, a firewall may restrict outbound traffic to specific ports, services or applications. For example, a web browser may not be able to send an outbound request on a port other than port 80. Any activity with an unknown source may be blocked. For example, a spyware program that is unknown to the firewall may be blocked from sending or receiving traffic. Firewalls may also distinguish between networks, that is, a local area network may have its traffic treated differently from a wide-area network, such as the Internet. A firewall may act as an endpoint for a secure tunnel, such as a layer 4 virtual private network (VPN). In some cases, the firewall may require a secure tunnel for some connections or applications. The firewall may react to specific instructions to block or allow traffic as applications or services request connections.

Figure 3:
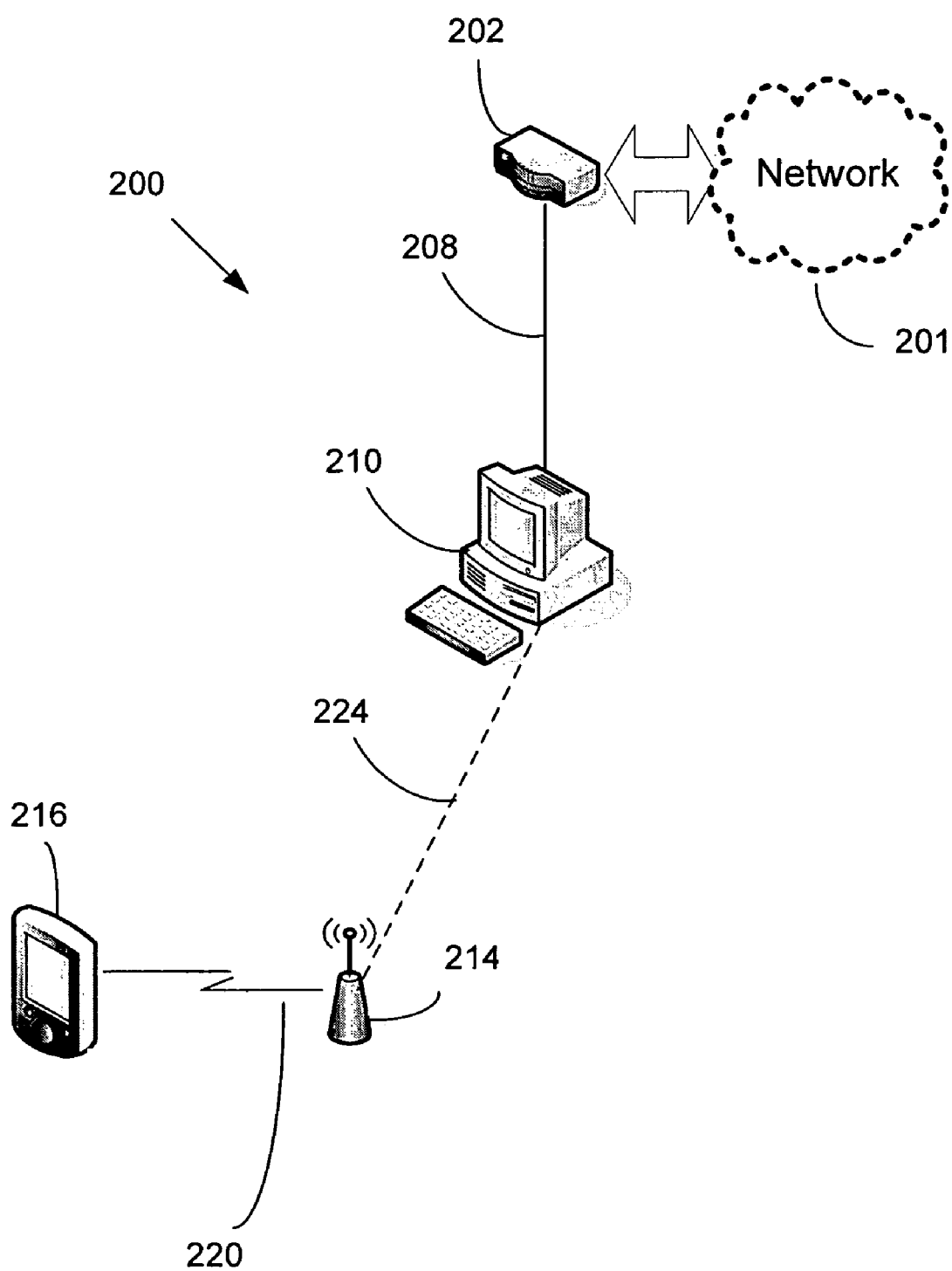
FIG. 3 is a logical view of one embodiment of the distributed firewall implementation.

FIG. 3 is a logical view of one embodiment of a distributed firewall implementation using the network 200 of FIG. 2. In a case where the IGD 202 does not provide suitable firewall services for a device, such as wireless device 216, computer 210, as well as IGD 202, may be configured to provide more appropriate firewall service. This may be accomplished by logically connecting the wireless access point 214 downstream from computer 210, such that all traffic intended for the wireless device 216 may be first routed through computer 210 via downstream connection 208 and logical connection 224.

Traffic for the wireless device 216 may include voice over IP (VOIP) or Internet packets. (Network agile smart phones may select a lower cost network such as WiFi when available.) The computer 210 may provide firewall services that restrict traffic to VOIP on one or more designated ports or Internet traffic to a designated wireless access protocol (WAP) port. The computer 210 may provide firewall services for itself as well. In such a case, it may publish that no services are required, so an upstream device or controller does not assign it default firewall services at another device. The logical connection 224 is discussed in more detail following with respect to FIG. 4.

Figure 4:
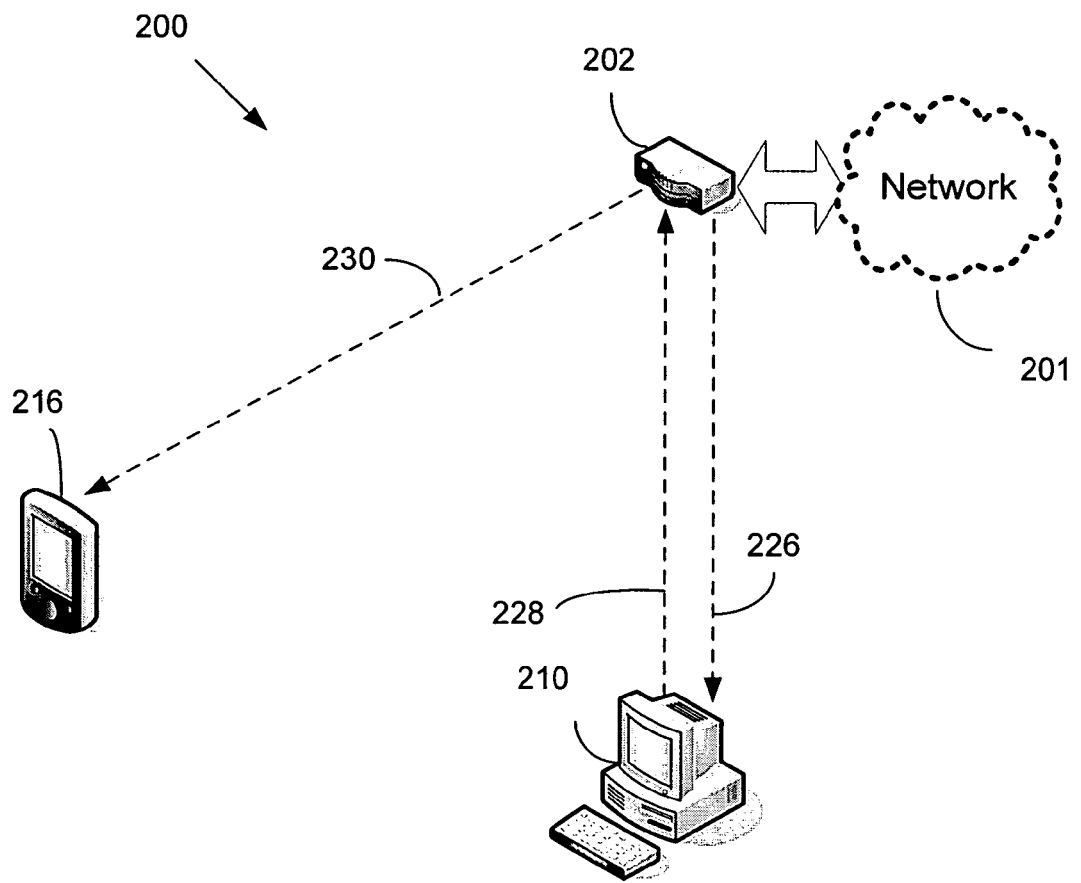
FIG. 4 is another logical view of the embodiment of the distributed firewall implementation of FIG. 3.

FIG. 4 is another logical view of the embodiment of the distributed firewall implementation of FIG. 3. In operation, the logical connection 224 may be accomplished by changes in both the IGD 202 and computer 210. Traffic arriving from the network 201 destined for wireless device 216 may be routed first to the device 210 over logical connection 226 (physical connection 208). The traffic may be filtered in computer 210, re-addressed to the wireless device 216 and transmitted to the IGD 202 via logical connection 228. At the IGD 202, the filtered traffic may be rerouted via logical connection 230 to the wireless device 216. The IDG may therefore treat packets addressed to the wireless device 216 differently, depending on the source. Packets addressed to the wireless device 216 coming from the network 201 may be routed to the computer 210, while packets addressed to the wireless device 216 originating at the computer 210 are routed to the wireless device 216. The logical connection 230 may correspond to the physical connection 212 from the IGD 202 to the wireless access point 214 and the over-the-air connection 220 from the wireless access point 214 to the wireless device 214.

In one embodiment, the wireless device 216 may publish a request for firewall services. The computer 210 may respond to the request and reach agreement with the wireless device 216 to provide the requested services. The IGD 202 may accept instructions from either the wireless device 216 or the computer 210 to reroute traffic as required. In some cases the IGD may accept instructions only from the device whose traffic is being rerouted. Cryptographic authentication may be required for the IGD 202 to accept such instructions. In another embodiment, the computer 210 may publish its ability to provide firewall services and the wireless device 216 may respond with a request. In both embodiments, the published data may use a peer-to-peer network discovery protocol to exchange firewall service information.

In yet another embodiment, the IGD 202, or one of the other downstream devices, may incorporate a manager that discovers firewall service requirements and firewall service capabilities and matches devices using that information. The manager may incorporate rules for identifying minimum firewall service requirements for each device, for example, by type. The manager may match firewall service providers to devices even when the device has some firewall capability, but, for example, doesn't meet the minimum firewall service requirement.

Figure 5:
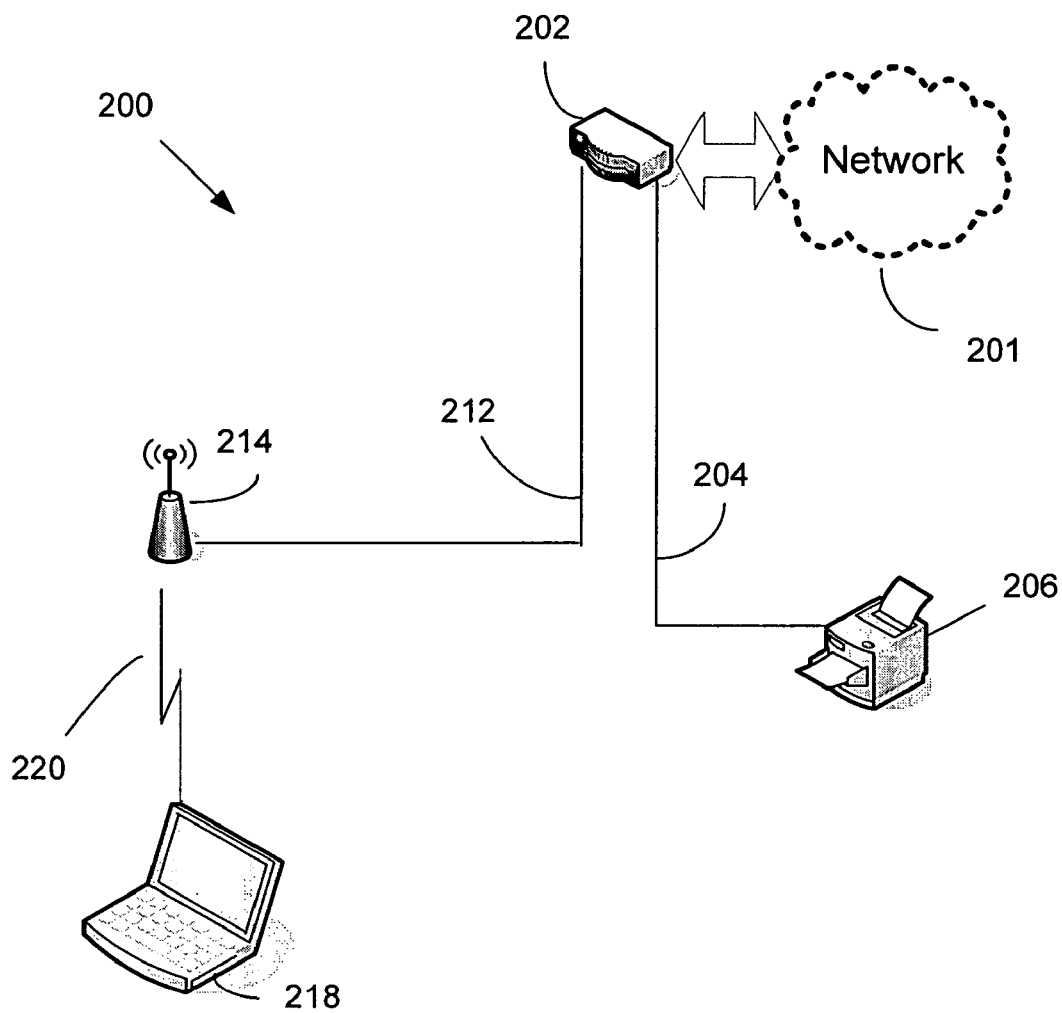
FIG. 5 is a block diagram of a computer network showing another embodiment of the distributed firewall implementation.
Figure 6:
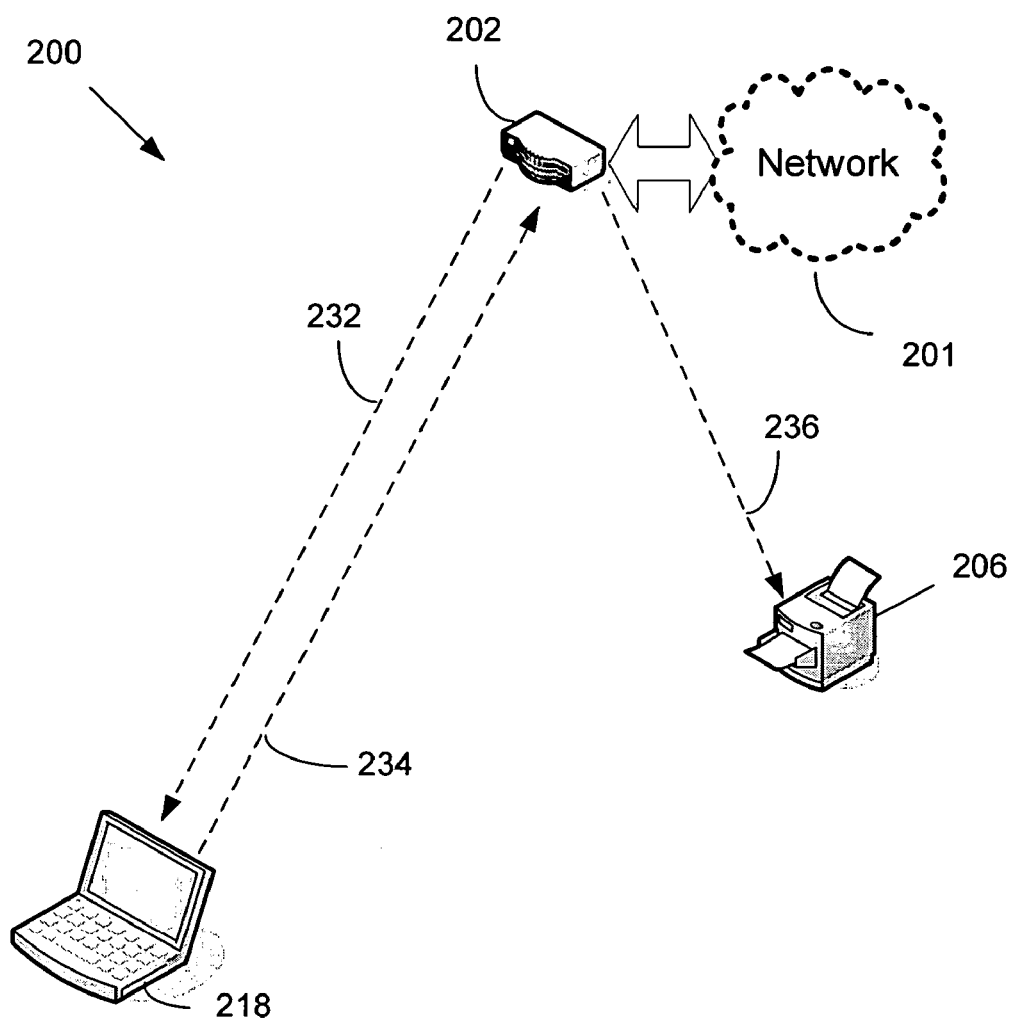
FIG. 6 is a logical view of the embodiment of FIG. 5.

FIG. 5 is a block diagram of a computer network showing another embodiment of the distributed firewall implementation. In this exemplary embodiment, laptop 218 provides firewall services to printer 206. The printer 206 may have programmable elements, or a rudimentary processing capability, such as font or color translation. The printer 206 may then request appropriate firewall services by publishing a request to limit traffic to port 80 for printing jobs and port 443 for processing font or translation requests. The laptop 218 may respond to the request for firewall services from the printer 206 and the printer 206 may accept. After receiving a confirmation from the printer 206, the laptop 218 may direct the IGD 202 to reroute traffic for the printer as shown in FIG. 6. Turning briefly to FIG. 6, traffic from the network 201 destined for the printer 206 may be directed first to the laptop 218 over logical connection 232. As above, the laptop 218 may perform the requested firewall services on behalf of the printer 206 and forward the filtered traffic to the IGD 202 over logical connection 234. The IGD 202 may then route the traffic to printer 206 over logical connection 236.

Returning to FIG. 5, in an alternate embodiment, the IGD 202 may have a firewall capability. The laptop 218 may recognize the need for specialized firewall services for the printer 206 and direct the IGD 202 to provide the necessary services for the printer 206. In this case, the laptop 218 acts as a director, but does not actively manage traffic. In the role of director, the laptop 218 may also monitor and manage other aspects of firewall activity. For example, the laptop 218 may be programmed with parental controls, allowing firewall settings to change by user or by time of day. The embodiment of FIGS. 5 and 6 use printer 206 and laptop 218 as exemplary network elements. The principals apply equally to other devices such as computer 210, PDA 216, or other devices not specifically depicted, such as a network-attached storage device.

Other sequences for firewall service discovery and agreement for services provisioning are possible, as discussed above with respect to FIG. 4.

Figure 7:
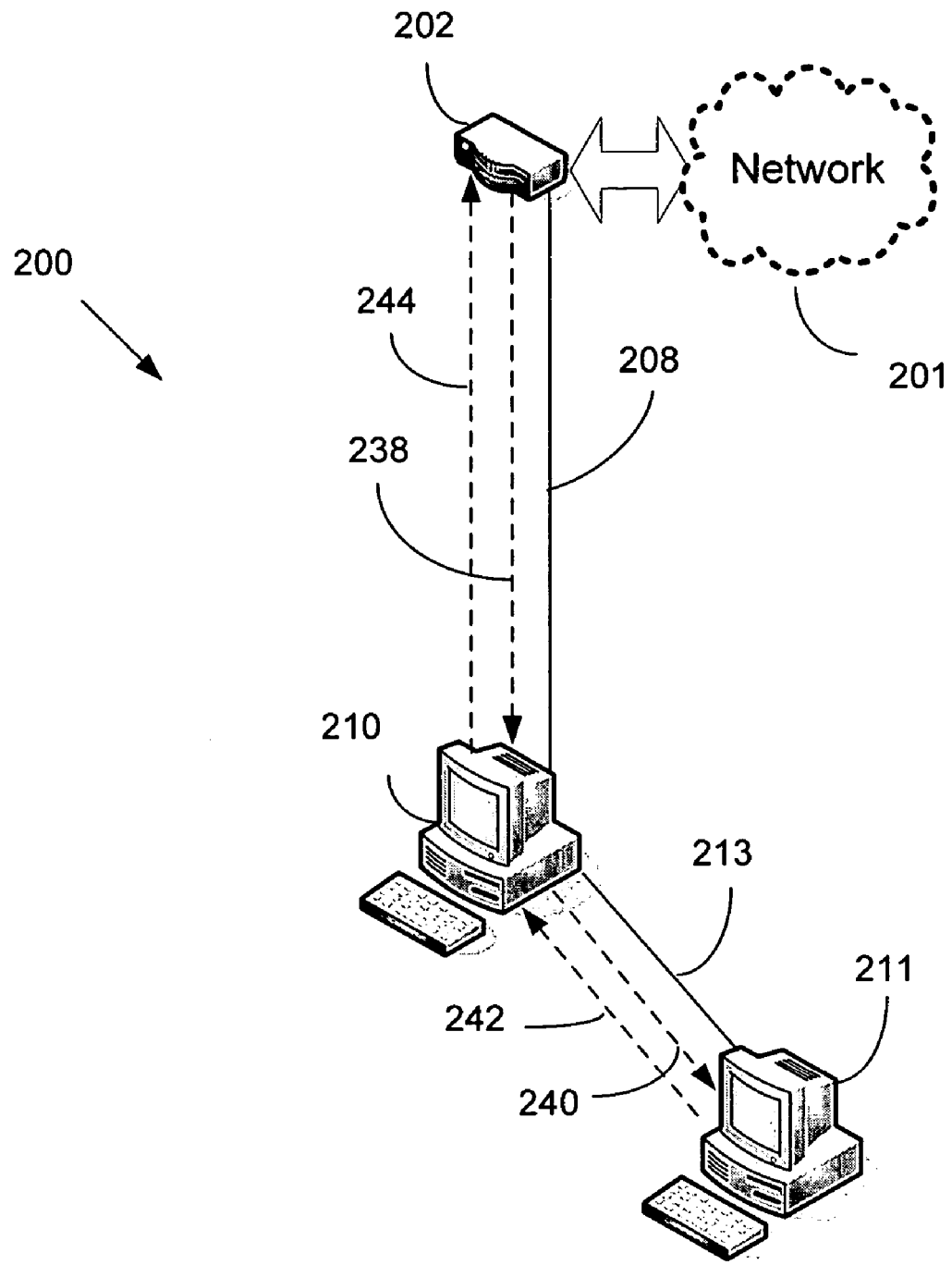
FIG. 7 is a view of yet another embodiment of a distributed firewall implementation.

FIG. 7 is a view of yet another embodiment of a distributed firewall implementation. Computer 210 is shown coupled to the network 201 over connection 208 via IGD 202. Computer 210 is also shown sharing its Internet connection with computer 211 over network connection 213. As mentioned above, this may be through an Internet connection sharing facility in computer 210 and may involve two network ports, one supporting connection 208 and the other supporting connection 213. Computer 211 may publish a request for firewall services and computer 210 may respond with its ability to provide the requested services. The two computers 210 211 may then agree to terms associated with providing the requested services. Such terms may include contractual or monetary considerations, but may also simply be an agreement that computer 210 will provide firewall services meeting the needs of computer 211, or a minimum requirement of the network 200. Logically, traffic received at the IGD 202 addressed to computer 211 may be transported to computer 210 over logical connection 238, filtered at computer 210 and forwarded over logical connection 240. Data from computer 211 may be sent via logical link 242 and forwarded via logical link 244 to the IGD 202 and eventually out to the network 201.

As shown in FIG. 2, other devices may exist on the downstream side of the IGD 202, including on network connection 208. The firewall services provided by computer 210 may offer protection not only from traffic on network 201, but also from undesired or unauthrorized traffic from these locally-connected devices.

Figure 8:
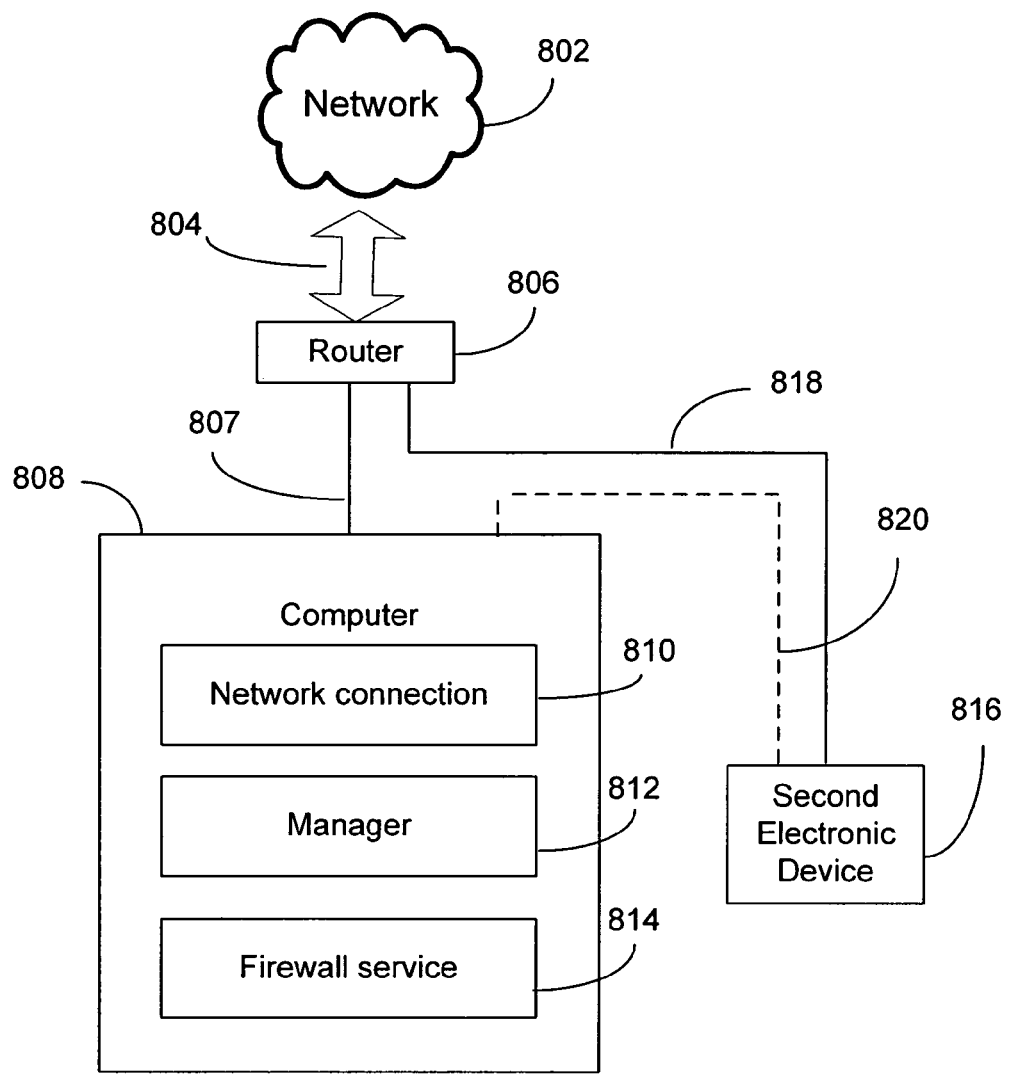
FIG. 8 is a representative block diagram of a computer suitable for participation in a distributed firewall implementation.

FIG. 8 is a representative block diagram of a computer suitable for participation in a distributed firewall implementation. A wide area network 802 may have a network connection 804 to a router 806 or other Internet gateway connection. The router 806 may be coupled to a computer 808 via a connection 807. The computer 808 may have a network connection 810 supporting the connection 807 to the router 806.

The computer 808 may also have a manager 812 or controller coupled to the network connection 810 and to a firewall service provider 814. The manager 812 may be operable to monitor published requests for firewall services from another device, such as electronic device 816. The manager 812 may then configure the network connection 810 to support receipt of traffic addressed to the electronic device 816 and route it to the firewall service 814. When traffic addressed to the electronic device 816 arrives, it may be routed to the firewall service 814 and processed according to the agreed upon firewall service requirements, resulting in filtered traffic. The network connection 810, in conjunction with the manager 812, may then return the filtered traffic from the firewall service 814 to the router 806 for delivery over network connection 818 to the electronic device 816. If the computer 808 also has some routing capability, it may send the filtered traffic directly to the electronic device 816 over connection 820. Traffic addressed to the computer 808 may also be processed by the firewall service 814.

In some cases, the manager 812 may change the level of firewall services provided, depending on requirements for compliance with standing policies or administrative rules. In many cases, the firewall services provided may be more restrictive than those requested by the electronic device 816, although less restrictive firewall services may apply. For example, less restrictive firewall services may be appropriate when the manager 812 is aware of upstream firewall services (not depicted) that reduce a local requirement.

Figure 9:
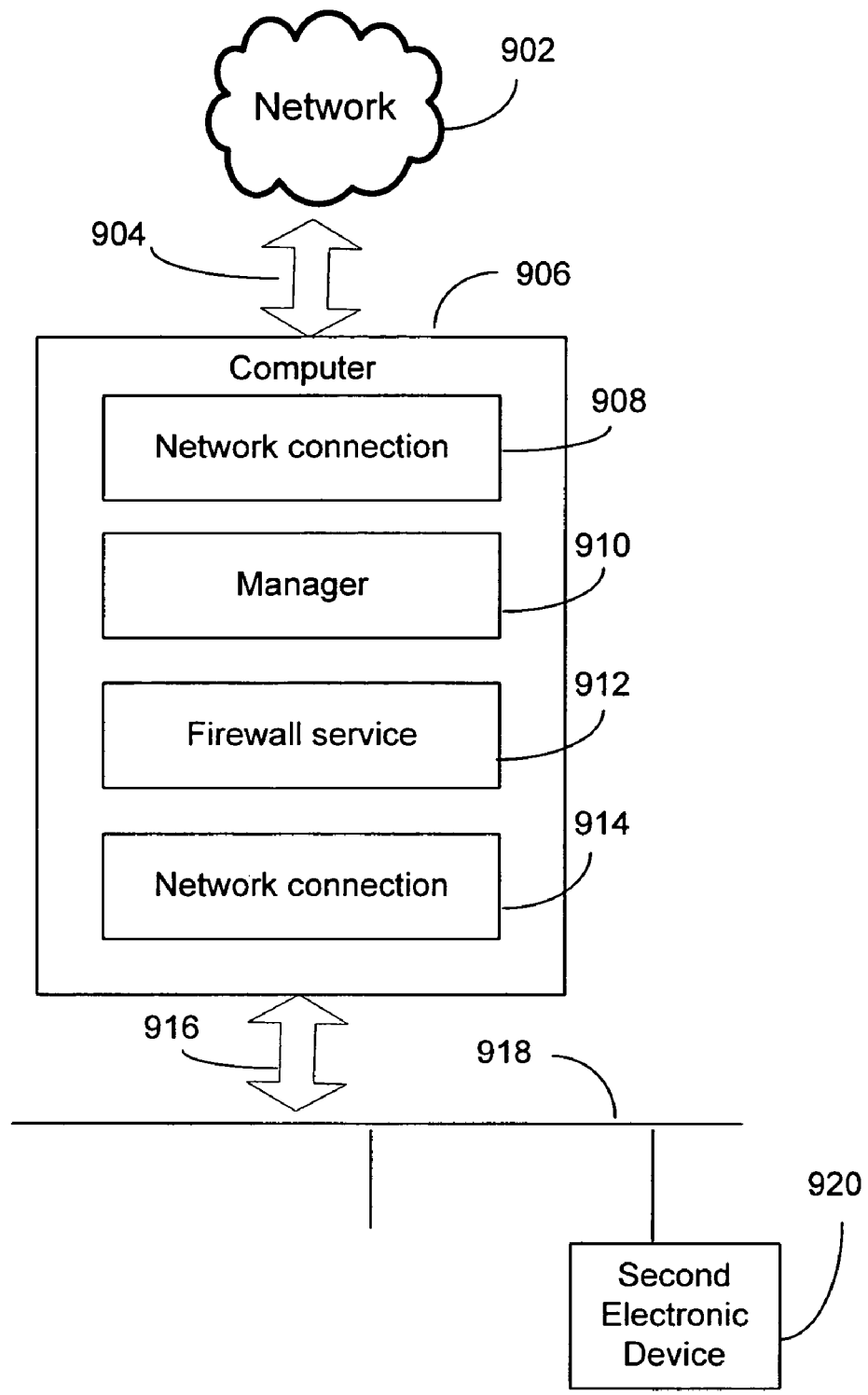
FIG. 9 is representative block diagram of another computer suitable for participation in a distributed firewall implementation.

FIG. 9 is a representative block diagram of another computer suitable for participation in a distributed firewall implementation. In an exemplary embodiment corresponding to the network configuration shown in FIG. 7, a network 902, such as the Internet, is shown coupled to computer 906 via network connection 904. The computer 906 has a first network connection 908, a manager 910 or controller, and a firewall service 912 similar to those described with respect to FIG. 8. Computer 906 is also shown having a second network connection 914 coupled via connection 916 to a network 918, and subsequently to electronic device 920. The electronic device 920 may request to firewall service, may respond to a published offer to provide firewall service by computer 906, or may be assigned a default firewall service when the computer 906 cannot determine the firewall capability of the electronic device 920.

Traffic addressed to the electronic device 920 arriving at the network connection 908 may be directed by the manager 910 to the firewall service 912 where filtering may be performed on behalf of the device 920. The manager 910 may then direct the filtered traffic to network connection 914 for delivery to the electronic device 920.

While current networks and devices are expected to benefit from the apparatus and techniques described above, networks converted to IPv6 using lower cost and lower function Internet gateway devices may be even bigger beneficiaries. Additionally, the use of an intelligent manager to evaluate firewall service needs and requirements, in light of administrative rules and current network architecture, may allow less duplication of functionality while maintaining or exceeding protection provided by previous firewall architectures.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

I claim:

1. A method of providing firewall services in a local area network having a plurality of devices comprising:
   determining firewall service capabilities published by each of a first device and a second device in the local area network, the first device and the second device each coupled to a downstream side of a router in the local area network, the router configured to receive traffic destined for the first device and the second device;
   determining that the firewall service capabilities published by the second device do not meet a firewall service requirement for the second device in the local area network;
   determining that the firewall service capabilities published by the first device meet a firewall service requirement for the first device in the local area network and meet the firewall service requirement for the second device in the local area network;
   configuring, by a controller, the router in the local area network to direct traffic destined for the second device to the first device over a first logical connection when the traffic destined for the second device is received by the router from an external network and to direct traffic destined for the second device to the second device over a second logical connection when the traffic destined for the second device is received by the router from the first device in the local area network; and
   implementing, by the controller, a distributed firewall system including the first device and the second device in the local area network by configuring the first device to provide firewall service for itself to meet the firewall service requirement for the first device and to provide firewall service for the second device to meet the firewall service requirement for the second device according to the firewall service capabilities published by the first device, wherein the first device is configured to:
      filter traffic directed to the first device by the router over the first logical connection according to the firewall service requirement for the first device when the traffic is destined for the first device,
      filter traffic directed to the first device by the router over the first logical connection according to the firewall service requirement for the second device when the traffic is destined for the second device,
      re-address the filtered traffic filtered according to the firewall service requirement for the second device to the second device, and
      transmit the traffic re-addressed to the second device to the router for delivery to the second device over the second logical connection.

2. The method of claim 1, further comprising monitoring the local area network for information published by the plurality of devices.

3. The method of claim 1, further comprising monitoring the local area network for a request for firewall services published by the second device.

4. The method of claim 3, wherein the firewall service requirement for the second device in the local network is more restrictive than the request for firewall services published by the second device.

5. The method of claim 1, further comprising selecting a default firewall service for a device in the local area network when no published information is available from the device.

6. The method of claim 1, wherein an upstream device in the local area network sets open access for its firewall service when a downstream device in the local area network has firewall service capabilities that meet a minimum firewall service requirement for the local area network.

7. The method of claim 1, further comprising:
   receiving firewall service capabilities published by the first device and the second using a peer-to-peer protocol; and
   publishing a firewall service requirement for the local area network to the plurality of devices using the peer-to-peer protocol.

8. A local area network having a plurality of devices adapted for configurable firewall protection comprising:
   a first device coupled to a downstream side of a router, the first device having firewall service capabilities that meet a firewall service requirement for the first device in the local area network;
   a second device coupled to the downstream side of the router, the second device having firewall service capabilities that do not meet a firewall service requirement for the second device in the local area network; and
   a controller for implementing a distributed firewall system including the first device and the second device in the local area network when the firewall service capabilities of the first device meet the firewall service requirement for the first device in the local area network and meet the firewall service requirement for the second device in the local area network by:
      configuring the router in the local area network to direct traffic destined for the second device to the first device over a first logical connection when the traffic destined for the second device is received by the router from an external network and to direct traffic destined for the second device to the second device over a second logical connection when the traffic destined for the second device is received by the router from the first device in the local area network, and
      configuring the first device to provide firewall service for itself to meet the firewall service requirement for the first device and to provide firewall service for the second device to meet the firewall service requirement for the second device according to the firewall service capabilities of the first device, wherein the first device is configured to:
         filter traffic directed to the first device by the router over the first logical connection according to the firewall service requirement for the first device when the traffic is destined for the first device,
         filter traffic directed to the first device by the router over the first logical connection according to the firewall service requirement for the second device when the traffic is destined for the second device,
         re-address the traffic filtered according the firewall service requirement for the second device to the second device, and
         transmit the traffic re-addressed to the second device to the router for delivery to the second device over the second logical connection.

9. The local area network of claim 8, wherein the second device publishes a request for firewall services.

10. The local area network of claim 8, wherein the controller configures the router to direct incoming traffic addressed to a smart phone to a personal computer when the firewall service capabilities of the smart phone do not meet a firewall service requirement for the local area network.

11. The local area network of claim 8, wherein the first device shares out a network connection to the second device.

12. The local area network of claim 8, wherein the first device publishes the firewall service capabilities of the first device.

13. The local area network of claim 12, wherein the second device receives the published firewall service capabilities of the first device and directs a request for firewall services to the first device.

14. The local area network of claim 8, wherein the controller monitors the local area network for firewall service capabilities and a firewall service requirements for each of the plurality of devices adapted for configurable firewall protection.

15. The local area network of claim 14, wherein the controller is incorporated in one of the first device and the router.

16. The local area network of claim 14, wherein the controller has a communication function for publishing a firewall service requirement for the local area network to each of the plurality of devices.

17. The local area network of claim 16, wherein the first device supplies the second device with a more restrictive firewall service than a firewall service requested by the second device when the firewall service requirement published by the controller is more restrictive than the firewall service requested by the second device.

18. The local area network of claim 14, wherein the controller assigns a default firewall service to a third device in the local area network that does not publish firewall service capabilities.

19. The local area network of claim 8, wherein the firewall service capabilities of the first device and the firewall service capabilities of the second device are published using a peer-to-peer network discovery protocol.

20. A computer storage medium that does not consist of a signal, the computer storage medium storing computer-executable instructions that, when executed, cause a computing device to perform a method of providing firewall services in a local area network, the method comprising:

determining firewall service capabilities published by each of a first device and a second device in the local area network, the first device and the second device each coupled to a downstream side of a router in the local area network, the router configured to receive traffic destined for the first device and the second device;

determining that the firewall service capabilities published by the second device do not meet a firewall service requirement for the second device in the local area network;

determining that the firewall service capabilities published by the first device meet a firewall service requirement for the first device in the local area network and meet the firewall service requirement for the second device in the local area network;

configuring the router in the local area network to direct traffic destined for the second device to the first device over a first logical connection when the traffic destined for the second device is received by the router from an external network and to direct traffic destined for the second device to the second device over a second logical connection when the traffic destined for the second device is received by the router from the first device in the local area network; and implementing a distributed firewall system including the first device and the second device in the local area network by configuring the first device to provide firewall service for itself to meet the firewall service requirement for the first device and to provide firewall service for the second device to meet the firewall service requirement for the second device according to the firewall service capabilities published by the first device, wherein the first device is configured to:

filter traffic directed to the first device by the router over the first logical connection according to the firewall service requirement for the first device when the traffic is destined for the first device, filter traffic directed to the first device by the router over the first logical connection according to the firewall service requirement for the second device when the traffic is destined for the second device, re-address the traffic filtered according to the firewall service requirement for the second device to the second device, and transmit the traffic re-addressed to the second device to the router for delivery to the second device over the second logical connection.

\* \* \* \* \*

UNITED STATES PATENT AND TRADEMARK OFFICE
CERTIFICATE OF CORRECTION

| | | |
|---|---|---|
| PATENT NO. | : 8,079,073 B2 | Page 1 of 1 |
| APPLICATION NO. | : 11/429476 | |
| DATED | : December 13, 2011 | |
| INVENTOR(S) | : David A. Roberts | |

It is certified that error appears in the above-identified patent and that said Letters Patent is hereby corrected as shown below:

In column 9, line 56, in Claim 1, after "the" delete "filtered".

In column 11, line 17, in Claim 14, after "and" delete "a".

Signed and Sealed this
Thirty-first Day of January, 2012

David J. Kappos
*Director of the United States Patent and Trademark Office*